(12) United States Patent
Yasuda et al.

(10) Patent No.: US 10,610,988 B2
(45) Date of Patent: Apr. 7, 2020

(54) WORKPIECE LIFTING AND LOWERING DEVICE

(71) Applicant: DMG MORI SEIKI CO., LTD., Nara (JP)

(72) Inventors: Hiroshi Yasuda, Nara (JP); Yutaka Nishimura, Nara (JP); Masami Harada, Nara (JP)

(73) Assignee: DMG MORI SEIKI CO., LTD., Yamatokoriyama-shi, Nara (JP)

( * ) Notice: Subject to any disclaimer, the term of this patent is extended or adjusted under 35 U.S.C. 154(b) by 417 days.

(21) Appl. No.: 15/314,716

(22) PCT Filed: Jun. 1, 2015

(86) PCT No.: PCT/JP2015/065734
§ 371 (c)(1),
(2) Date: Nov. 29, 2016

(87) PCT Pub. No.: WO2015/186652
PCT Pub. Date: Dec. 10, 2015

(65) Prior Publication Data
US 2018/0079039 A1    Mar. 22, 2018

(30) Foreign Application Priority Data

Jun. 4, 2014 (JP) ................................. 2014-116023

(51) Int. Cl.
*B23Q 1/48*   (2006.01)
*B23Q 1/54*   (2006.01)
(Continued)

(52) U.S. Cl.
CPC .............. *B23Q 1/5443* (2013.01); *B23Q 1/44* (2013.01); *B23Q 1/4804* (2013.01);
(Continued)

(58) Field of Classification Search
CPC ...... B23Q 1/44; B23Q 1/4804; B23Q 1/5437; B23Q 1/4852; B23Q 5/341; B23Q 7/005; F16H 21/365; F16H 21/124
See application file for complete search history.

(56) References Cited

U.S. PATENT DOCUMENTS 3,350,065 A * 10/1967 Mankey .................... B66F 7/08
                                                          254/122
3,988,014 A * 10/1976 Worden ................... B23Q 1/48
                                                           269/71
(Continued)

FOREIGN PATENT DOCUMENTS

GB      2073843 A      10/1981
JP      56-143854 A    11/1981
(Continued)

OTHER PUBLICATIONS

International Search Report issued for corresponding PCT/JP2015/065734 application.

*Primary Examiner* — Joseph J Hail
*Assistant Examiner* — Arman Milanian
(74) *Attorney, Agent, or Firm* — IP Business Solutions, LLC

(57) ABSTRACT

A workpiece lifting and lowering device is provided with: a workpiece base supported as to be capable of being lifted and lowered, and mounting a workpiece; a link mechanism connected to the workpiece base, and lifting and lowering the workpiece base by converting a rotation motion to a lifting and lowering motion; and a driving mechanism rotationally driving the link mechanism through a transmission member.

2 Claims, 6 Drawing Sheets

(51) Int. Cl.
 B23Q 5/34 (2006.01)
 B23Q 7/00 (2006.01)
 B23Q 1/44 (2006.01)
(52) U.S. Cl.
 CPC ......... *B23Q 1/4852* (2013.01); *B23Q 1/5437* (2013.01); *B23Q 5/341* (2013.01); *B23Q 7/005* (2013.01)

(56) References Cited

U.S. PATENT DOCUMENTS

| 4,969,793 A | * | 11/1990 | Pawl | B60R 5/04 187/269 |
| 6,073,551 A | | 6/2000 | Dangelmayr et al. | |
| 2012/0266783 A1 | | 10/2012 | Yoshida | |

FOREIGN PATENT DOCUMENTS

| JP | 56143854 A | * | 11/1981 | ............... B30B 1/10 |
| JP | S59-130897 U | | 9/1984 | |
| JP | S63-172532 U | | 11/1988 | |
| JP | 4-159040 A | | 6/1992 | |
| JP | 2008-229816 A | | 10/2008 | |
| JP | 2012-228740 A | | 11/2012 | |
| JP | 2014-180718 A | | 9/2014 | |
| JP | 2014180718 A | * | 9/2014 | ............... B23Q 1/64 |
| WO | 2012/020164 A1 | | 2/2012 | |

\* cited by examiner

WORKPIECE LIFTING AND LOWERING DEVICE

CROSS-REFERENCE TO RELATED APPLICATIONS

This is the U.S. National Phase under 35 U.S.C. 371 of International Application No. PCT/JP2015/65734, filed on Jun. 1, 2015, which in turn claims the benefit of Japanese Patent Application No. 2014-116023, filed on Jun. 4, 2014, the disclosures of which are incorporated by reference herein.

BACKGROUND OF THE INVENTION

Field of the Invention

The present invention relates to a workpiece lifting and lowering device which lifts and lowers a workpiece between a workpiece processing position and a workpiece conveying position, which is the position higher than the processing position, in, for example, a machine tool.

Description of the Related Art

In a case of machining a workpiece in a machine tool, for example, Japanese Utility Model Patent Application No. 63-172532 discloses a conventional workpiece lifting and lowering device which is capable of lifting and lowering the workpiece. In the conventional device, a cylinder mechanism is arranged in a base in a manner of projecting below from the base, and a table for setting workpiece is horizontally fixed in the upper end of the piston rode of the cylinder mechanism.

In the conventional device described in Japanese Utility Model Patent Application No. 63-172532, when a lifting and lowering stroke becomes larger, the cylinder mechanism becomes longer. Therefore, when it is mounted in the machine tool, there is a problem that the entire machine becomes large in size. Specifically, in a case in which the table for setting workpiece is provided in a turnable manner, since the cylinder mechanism is elongated below the base, the turn radius becomes large.

The description herein of advantages and disadvantages of various features, embodiments, methods, and apparatus disclosed in other publications is in no way intended to limit the present invention. For example, certain features of the preferred described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The disclosed embodiments of the present invention have been developed in view of the above-mentioned and/or other problems in the related art. The disclosed embodiments of the present invention can significantly improve upon existing methods and/or apparatuses.

The present invention was created considering the aforementioned conventional status, and an object thereof is to provide a workpiece lifting and lowering device which can suppress an enlargement of an entire machine even though a lifting and lowering stroke becomes large.

In some embodiments of the present disclosure, a workpiece lifting and lowering device includes a workpiece base supported as to be capable of being lifted and lowered, and mounting a workpiece; a link mechanism connected to the workpiece base, and lifting and lowering the workpiece base by converting a rotation motion to a lifting and lowering motion; and a driving mechanism rotationally driving the link mechanism through a transmission member.

In some embodiments of the present disclosure, in the workpiece lifting and lowering device as recited above, the link mechanism includes a pair of first and second link mechanisms which is connected to the workpiece base, the transmission member includes first and second transmission members which transmit the rotation motion of the first and second link mechanism, and the driving mechanism rotationally drives the first and second transmission members by one common driving source.

In some embodiments of the present disclosure, in the workpiece lifting and lowering device as recited above, the first and second link mechanisms include first and second revolving arms, which are rotationally driven by the first and second transmission members, and first and second cam plates, to which the workpiece base is stretched and fixed, and which have cam grooves in which a tip end part of the first and second revolving arms are connected.

In some embodiments of the present disclosure, in the workpiece lifting and lowering device as recited above, the workpiece lifting and lowering device is mounted in a workpiece tilting device which is capable of tilting in an appropriate state for machining the workpiece, and the driving mechanism is arranged between a frame of the workpiece lifting and lowering device and a bottom part of the workpiece tilting device.

According to some embodiments as recited above, the rotation motion converts to the lifting and lowering motion by the link mechanism which is rotationally driven by driving mechanism through the transmission member, so as to lift and lower the workpiece base, which is supported as to be capable of being lifted and lowered, and therefore, the lifting and lowering stroke is easily enlarged. In a case of lifting and lowering a table by the cylinder mechanism, the cylinder mechanism becomes large due to the enlargement of the lifting and lowering stroke. As a result, in comparison with the conventional device of which the entire machine becomes large, the enlargement of the entire machine can be suppressed.

According to some embodiments as recited above, a pair of the first and second link mechanisms is rotationally driven by one common driving source through the first and second transmission members. The driving source is provided between the first and second link mechanisms, and therefore, the enlargement of the entire machine can be more surely suppressed. Further, the two link mechanisms are driven by one driving source, so that the increase of the cost can be suppressed.

According to some embodiments as recited above, in the first and second link mechanisms, the tip end parts of the first and second revolving arms, which are rotationally driven in the first and second transmission members, are connected to the cam grooves of the first and second cam plates, and the workpiece base is stretched and fixed to the first and second cam plates. Therefore, the lifting and lowering stroke which is twice of the arm length of the first and second revolving arms can be secured, and the enlargement of the entire machine can be more surely suppressed.

According to some embodiments as recited above, the workpiece lifting and lowering device is mounted in the workpiece tilting device, so that the workpiece mounted in the workpiece lifting and lowering device is tilted and positioned in an appropriate machining state by the workpiece tilting device, and the machining can be immediately performed. The machined workpiece can be immediately lifted to the workpiece conveying position by the workpiece lifting and lowering device. As a result, the necessary time for a series of actions to the next step after machining the workpiece can be shortened.

Further, the driving mechanism is arranged in a space between the frame of the workpiece lifting and lowering device and the bottom part of the workpiece tilting device, and therefore, the enlargement of the dimension in the height direction of the entire machine can be avoided while the workpiece lifting and lowering device is mounted in the workpiece tilting device.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. In the drawings, the size and relative sizes of layers and regions may be exaggerated for clarity. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/". It will be understood that, although the terms first, second, etc. may be used herein to describe various elements, these elements should not be limited by these terms. Unless indicated otherwise, these terms are only used to distinguish one element from another. For example, a first object could be termed a second object, and, similarly, a second object could be termed a first object without departing from the teachings of the disclosure. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct contact (i.e., touching) unless the context indicates otherwise. Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

BRIEF DESCRIPTION OF THE DRAWINGS

FIG. 6(*b*) is a schematic perspective view to explain motions of the workpiece lifting and lowering device.

FIG. 6(*c*) is a schematic perspective view to explain motions of the workpiece lifting and lowering device.

FIG. 6(*d*) is a schematic perspective view to explain motions of the workpiece lifting and lowering device.

FIG. 6(*e*) is a schematic perspective view to explain motions of the workpiece lifting and lowering device.

DETAILED DESCRIPTION

In the following paragraphs, some embodiments of the invention will be described by way of example and not limitation. It should be understood based on this disclosure that various other modifications can be made by those in the art based on these illustrated embodiments.

Hereinafter, embodiments of the present invention will be described in reference to the drawings.

Embodiment 1

Figure 1:
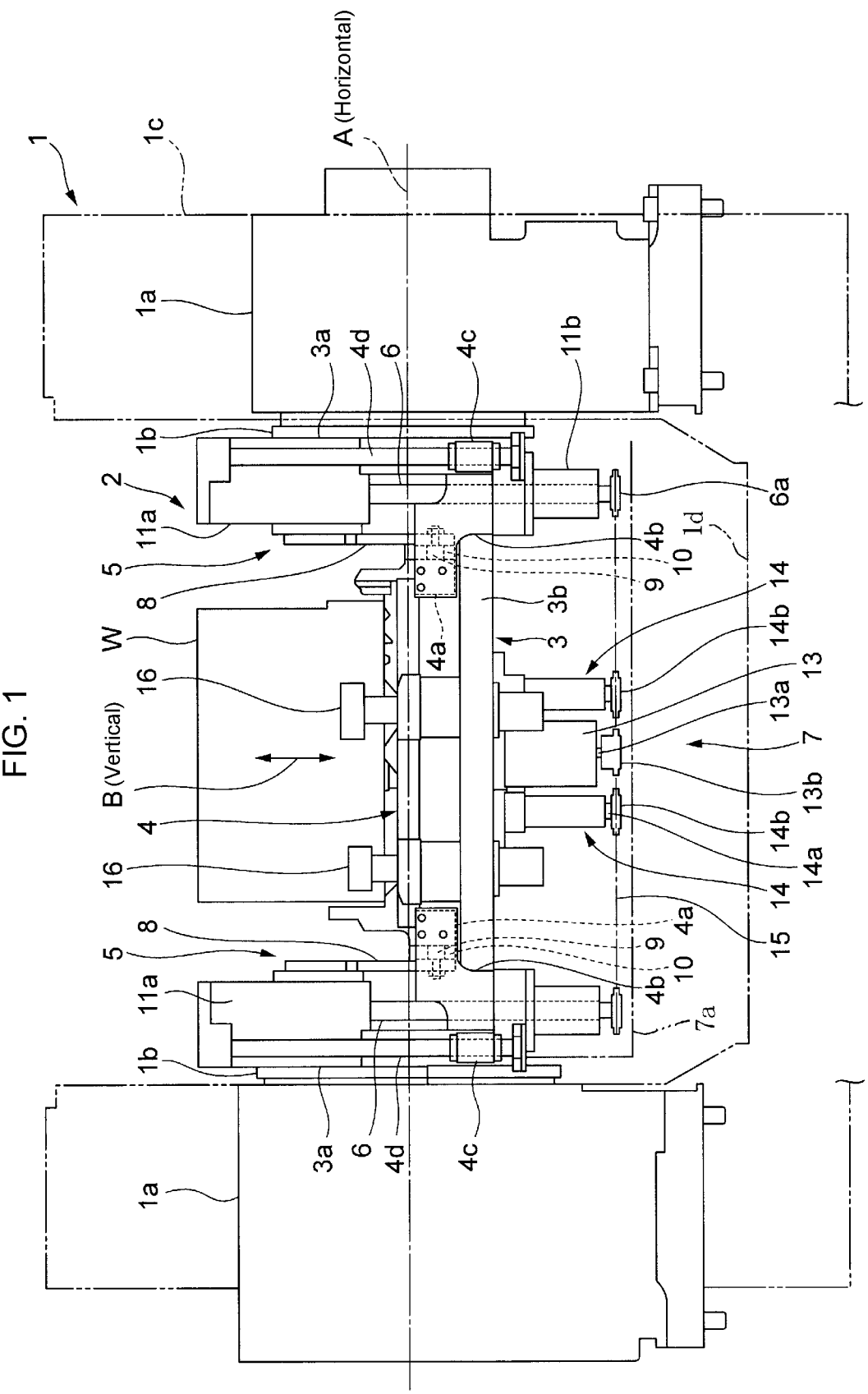
FIG. 1 is a front view showing a state in which a workpiece lifting and lowering device according to embodiment 1 of the present invention is mounted in a workpiece tilting device.
Figure 2:
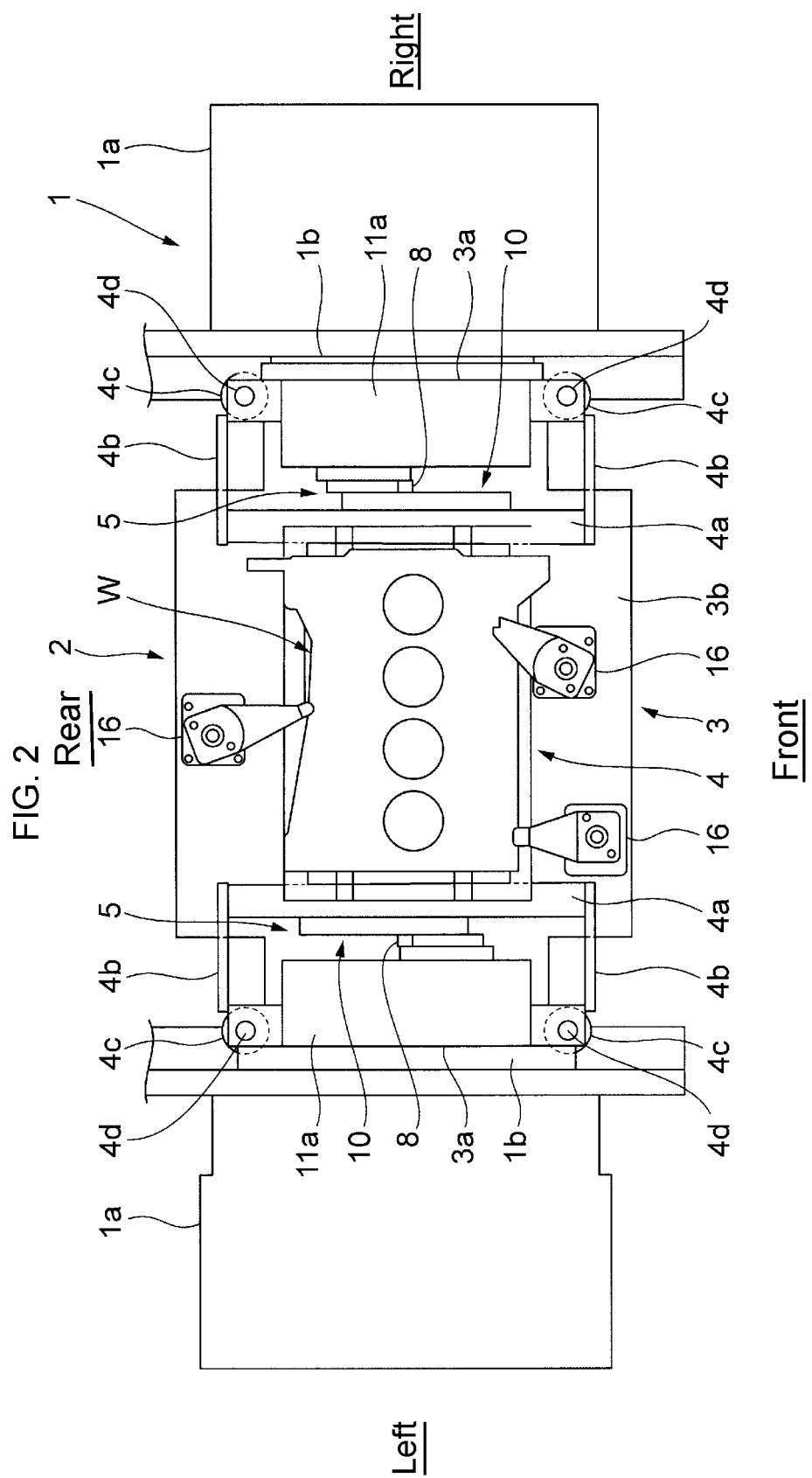
FIG. 2 is a plane view showing a state in which the workpiece lifting and lowering device is mounted in the workpiece tilting device.

FIGS. 1 to 6 are diagrams to explain the workpiece lifting and lowering device according to embodiment 1 of the present invention. In embodiment 1, unless otherwise specified, the indications "front", "rear", "right" and "left" mean the front side, rear side, left side and right side of the workpiece tilting device as shown in FIG. 2.

In the drawings, reference numeral 1 denotes a workpiece tilting device capable of tilting a workpiece W around a horizontal tilt rotation axis A. A workpiece lifting and lowering device 2 which is capable of lifting and lowering the workpiece W in a vertical direction B is mounted inside the workpiece tilting device 1.

The workpiece tilting device 1 tilts the workpiece W, which is fixed in the workpiece lifting and lowering device 2, in an optimum state such as an angular position, etc., together with the workpiece lifting and lowering device 2 so as to determine the angular position. By the machine tool (not shown in this state), various kinds of machining are applied to the workpiece W.

The workpiece tilting device 1 has a schematic configuration in which driving parts 1b, 1b are arranged to be capable of rotation indexing and positioning inside right and left support wall parts 1a, 1a. Reference numeral 1c denotes a machine body cover.

The workpiece lifting and lowering device 2 is provided with a frame 3 which includes a pair of right and left side walls 3a, 3a, and a bottom wall 3b stretched and fixed in the lower end part of both of the side walls 3a, 3a. The right and left side walls 3a, 3a of the frame 3 are fixed to the driving parts 1b, 1b of the workpiece tilting device 1.

A workpiece base 4 is arranged between the right and left side walls 3a, 3a of the frame 3 so as to be capable of being lifted and lowered in the direction B. Right and left (first and second) link mechanisms 5, 5, which convert rotation motion to lifting and lowering motion of the workpiece base 4, are connected to the workpiece base 4, and the link mechanisms 5, 5 are rotationally driven by a common driving mechanism 7 through right and left (first and second) transmission rods 6, 6.

The workpiece base 4 is a rectangular frame shape in a plane view, and the shape and the size are set with respect to the mounted workpiece W. Reference numeral 16 denotes a clamping device for fixing the workpiece W on the work piece base 4.

Right and left support members 4a, 4a are fixed to the right and left edge parts of the workpiece base 4, and one end parts of the support plates 4b, 4b are fixed to the rear end parts (upper part of FIG. 2, lower end parts) which are in front of the support members 4a, 4a, and a guide tube 4c is fixed to the other end part of each support plate 4b. Each of the guide tubes 4c is slidably supported by a guide rod 4d which extends in the direction B. Each of the guide rods 4d is fixed to the front and rear edge parts of the right and left side walls 3a of the frame 3. With this structure, the workpiece base 4 is capable of being lifted and lowered in the direction B.

Each of the link mechanisms 5 is provided with a revolving arm 8, a cam follower 9 mounted in the tip end part of the revolving arm 8, and a cam plate 10 which includes a cam groove 10a in which the cam follower 9 moves.

The base end part of the revolving arm 8 is fixed in a rotary shaft 8a. The rotary shaft 8a is inserted inside a gear box 11 fixed on an inner surface of a side wall 3a of the frame 3, and it is rotatably supported by a bearing which is not shown in the drawings. In the rotary shaft 8a, a helical gear 12a of a worm gear mechanism 12 which will be described later is formed.

The cam groove 10a of the cam plate 10 is formed to extend in a horizontal direction which is orthogonal to the lifting and lowering direction. The cam plate 10 is fixed on the outer surface of the right and left support members 4a of the workpiece base 4. With this structure, the workpiece base 4 is stretched between the right and left cam plate 5, 5 in the horizontal direction.

The transmission rods 6, 6 are rotatably arranged parallel to the guide rod 4d. The upper end part of each of the transmission rods 6 is inserted inside the gear box 11a and is rotatably supported by a bearing which is not shown in the drawings. Further, a screw gear is formed in the upper end part of the transmission rod 6, and the screw gear 12b meshes with the helical gear 12a, and therefore, the worm gear mechanism 12 which transmits the rotation of the transmission rod 6 to the rotary shaft 8a which is orthogonal to the rod 6 is constituted. The lower end part of the transmission rod 6 is rotatably supported by the bearing box 11b, and a sprocket 6a is mounted in a projection part which is formed below the bearing box 11b. The bearing box 11b is fixed in the bottom wall 3b of the frame 3 through the bracket.

The driving mechanism 7 is arranged between the bottom wall 3b of the frame 3 and the bottom part 1d of the workpiece tilting device 1. Specifically, it is provided with a hydraulic motor (driving source) 13 in which a rotary shaft 13a is fixed and extends downwardly on the lower surface of the bottom wall 3b, and guide boxes 14, 14 in which a guide shaft 14a is fixed and extends downwardly near right and left of the hydraulic motor 13. The driving mechanism 7 is surrounded by a cover 7a which is mounted on the lower surface of the bottom wall 3b.

An endless driving chain 15 is wound around a driving sprocket 13b which is fixed in the rotary shaft 13a of the hydraulic motor 13, guide sprockets 14b, 14b which are fixed in a guide shaft 14a pivotally supported in the guide box 14, and the transmission sprockets 6a, 6a of the transmission rods 6, 6. The guide sprockets 14b, 14b are provided to secure a winding angle of the driving sprocket 13b.

It is not shown in the drawings, but the hydraulic pressure feeding passage to the hydraulic motor 13 is formed by penetrating through the driving part 1b, 1b of the workpiece tilting device 1 and passing from the side wall 3a of the frame 3 to the bottom wall 3b.

Figure 6:
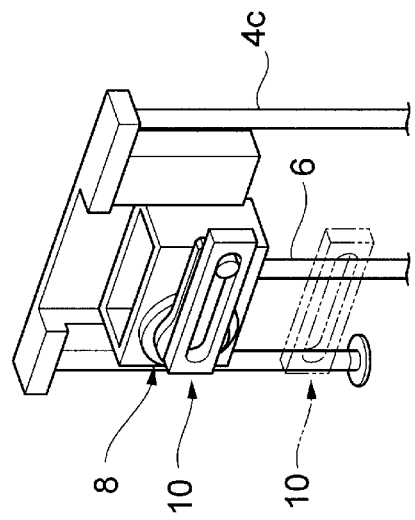
FIG. 6(*a*) is a schematic perspective view to explain motions of the workpiece lifting and lowering device.
Figure 6:
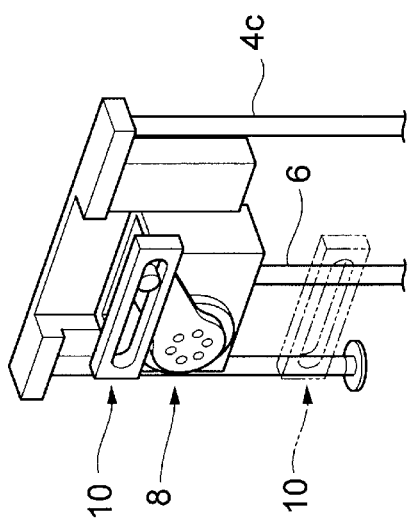
Figure 6:
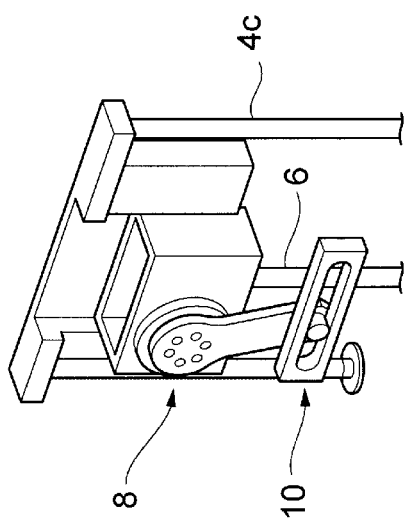
Figure 6:
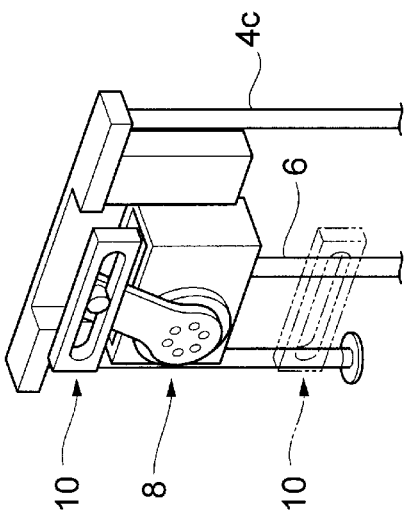
Figure 6:
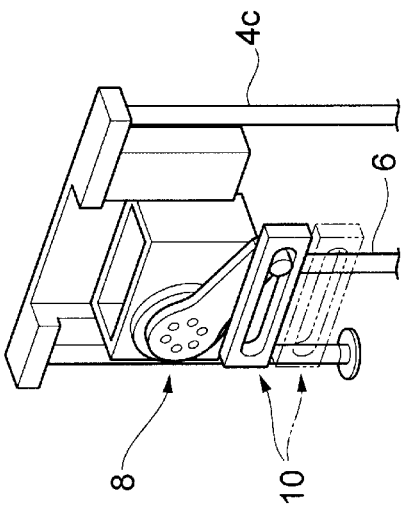

In the workpiece lifting and lowering device 2 of the present embodiment, the rotation of the hydraulic motor 13 is transmitted from a driving chain 15 to the revolving arm 8 through the transmission rod 6 and the worm gear mechanism 12. The revolving arm 8 rotates while moving the cam follower 9 in the cam groove 10a of the cam plate 10, so as to lift and lower the cam plate 10 and the workpiece base 4 as shown in FIG. 6.

Figure 3:
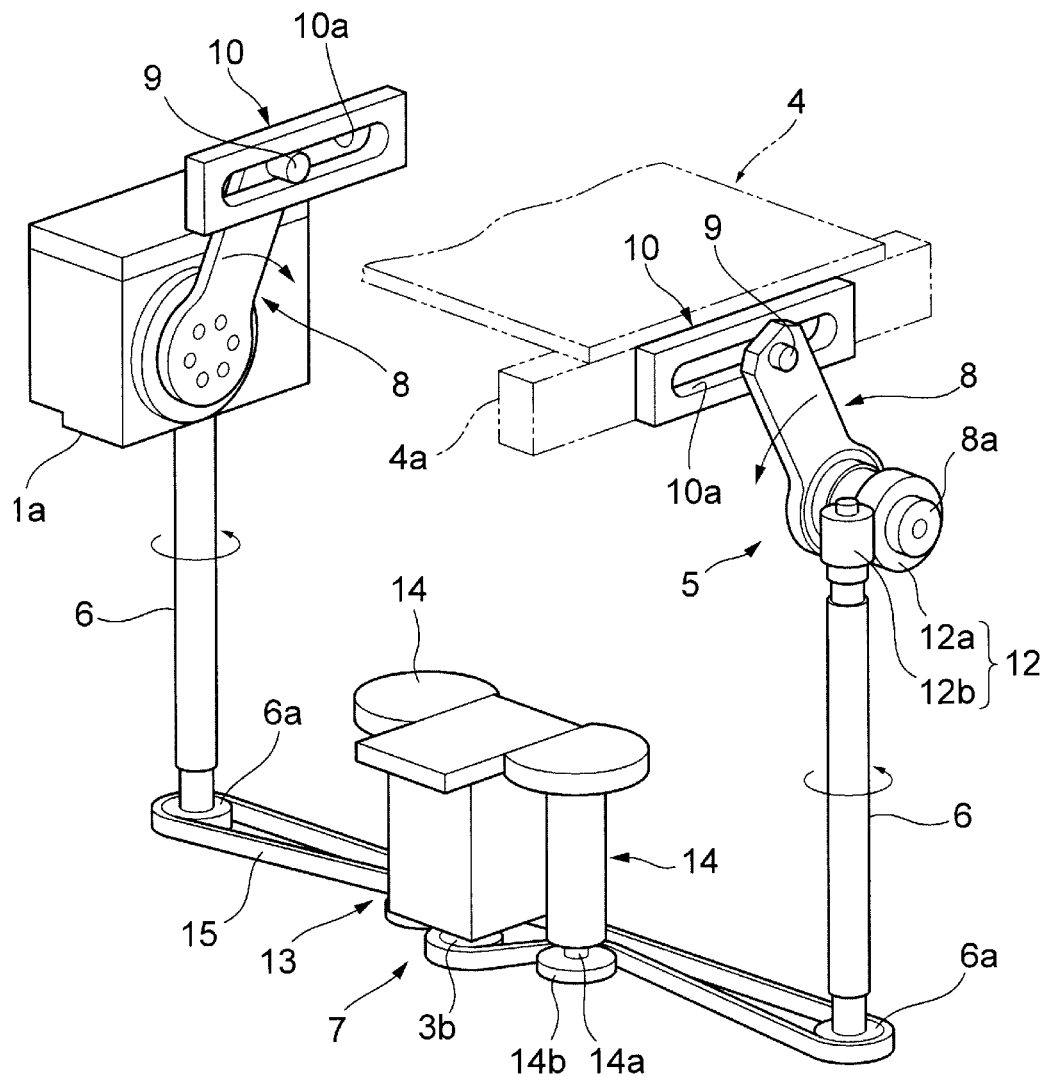
FIG. 3 is a schematic perspective view showing a schematic configuration of the workpiece lifting and lowering device.
Figure 4:
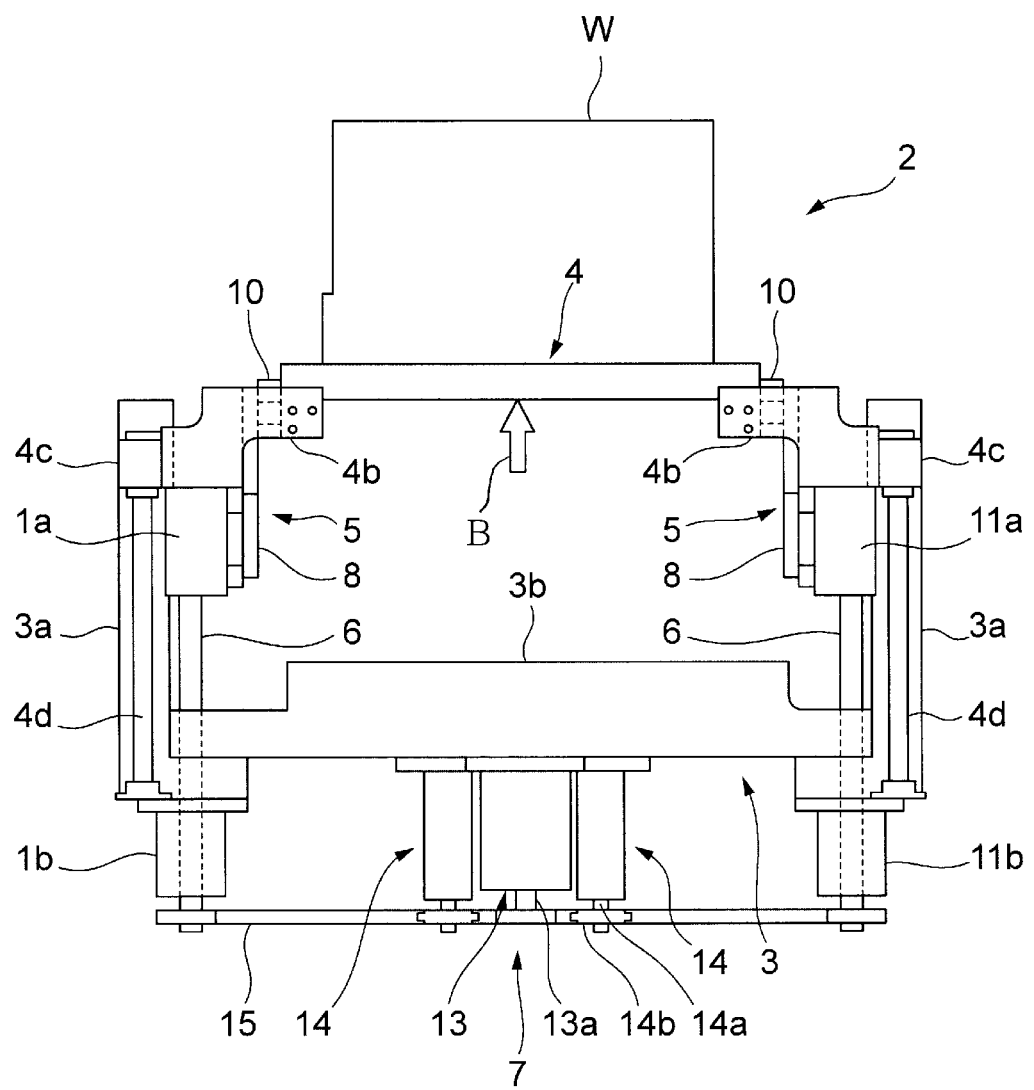
FIG. 4 is a front view at the time of the maximum stroke of the workpiece lifting and lowering device.
Figure 5:
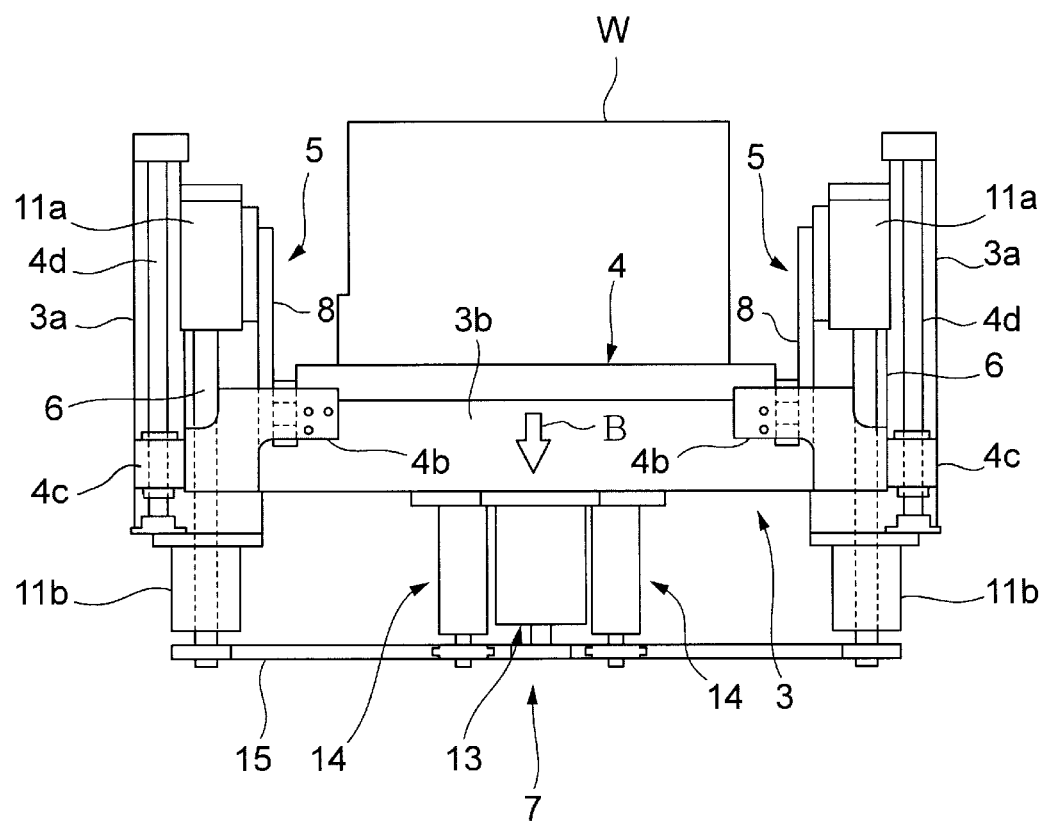
FIG. 5 is a front view at the time of the minimum stroke of the workpiece lifting and lowering device.

In the lifting and lowering motion, as shown in FIG. 3, the right side revolving arm 8 rotates counterclockwise, and on the other hand, the left side revolving arm 8 rotates clockwise. That is, in the plane view, the support points of the right and left cam plates 10, 10 by the right and left cam followers 9, 9 are arranged in the same distance from the tilt rotation axis A in the front side and the rear side thereof. Therefore, the workpiece base 4 can be supported in a stable manner.

In the present embodiment 1, the revolving arms 8 are rotated by the driving mechanism 7 through the transmission rods 6, and the rotation motion of the revolving arms 8 converts to the lifting and lowering motion of the workpiece base 4 by the cam followers 9 and the cam plates 10, so that the lifting and lowering stroke which is twice of the length of the revolving arms 8 can be secured. Therefore, in comparison with the conventional machine provided with a cylinder mechanism, it can suppress the entire machine becoming large in size.

Further, in the present embodiment, the rotation center height of the revolving arms 8 is fixed, and the workpiece base 4 is lifted and lowered between the lower side and the upper side of the rotation center, so that the gravity center of the lifting and lowering of the workpiece W can be suppressed, and the gravity balance of the entire machine becomes excellent.

Further, two link mechanisms 5, 5 are driven by one common hydraulic motor 13, which is provided in the middle of the both link mechanisms, through the driving chain 15 and the transmission rods 6, and therefore, the motion of the both link mechanisms 5, 5 can be easily and surely synchronized. In addition, as described above, the support points of the workpiece base 4 by the right and left link mechanisms 5, 5 are arranged in the same distance from the tilt rotation axis A in the front side and the rear side thereof, so that the support state of the workpiece base 4 can be stabilized.

Further, two link mechanisms 5, 5 are driven by one driving source, and therefore, the increase of the cost can be suppressed.

Further, in the present embodiment, the workpiece lifting and lowering device 2 is mounted in the workpiece tilting device 1, and the driving mechanism 7 is arranged in the space between the bottom wall 3d of the frame 3 of the work piece lifting and lowering device 2 and the bottom part of the work piece tilting device 1, so as to avoid the enlargement of the dimension in the height direction of the entire machine due to providing the workpiece lifting and lowering device 2.

Further, the workpiece lifting and lowering device 2 is mounted in the workpiece tilting device 1, so that the workpiece W mounted in the workpiece lifting and lowering device 2 is positioned by tilting the workpiece tilting device 1 in a proper state for the machining, and machining the workpiece can be smoothly performed. The machined workpiece W can be smoothly lifted to the workpiece conveying position by the workpiece lifting and lowering device 2, and as a result, the necessary time for a series of actions to the next step after machining the workpiece W can be shortened.

The terms and descriptions used herein are used only for explanatory purposes and the present invention is not limited to them. Accordingly, the present invention allows various design-changes falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspects within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A workpiece lifting and lowering device comprising:
   a workpiece base supported as to be capable of being lifted and lowered, and mounting a workpiece;
   first and second cam followers;
   a link mechanism connected to the workpiece base, and lifting and lowering the workpiece base by converting a rotation motion to a lifting and lowering motion; and
   a driving mechanism rotationally driving the link mechanism through a transmission member,
   the link mechanism including first and second link mechanisms connected to respectively first and second ends of the workpiece base,
   the transmission member including first and second transmission members respectively transmitting rotation to the first and second link mechanisms, the first and second transmission members being configured in a vertical direction,
   the driving mechanism rotationally driving, as a common drive source, the first and second mechanisms by winding a chain around a driving sprocket of a rotary shaft of the common drive source and around a transmission sprocket of the first and second transmission members,
   the first and second link mechanism including first and second arms having first and second tip ends respectively, and first and second cam plates having first and second cam grooves respectively to which the first and second tip ends are engaged respectively, the first and second arms being configured to be rotated by the first and second transmission parts via a worm gear mechanism,
   the first cam and second cam plates respectively having first and second grooves extending in a horizontal direction,
   the first and second cam followers configured on tips of the first and second arms respectively and movably engaged with the first and second grooves respectively.

2. A workpiece lifting and lowering device comprising:
   a workpiece base supported as to be capable of being lifted and lowered, and mounting a workpiece;
   a link mechanism connected to the workpiece base, and lifting and lowering the workpiece base by converting a rotation motion to a lifting and lowering motion; and
   workpiece lifting and lowering device including a driving mechanism rotationally driving the link mechanism through a transmission member, wherein
   the link mechanism includes a pair of first and second link mechanisms which is connected to the workpiece base,
   the transmission member includes first and second transmission members which transmit the rotation motion of the first and second link mechanisms, the first and second transmission members being configured in a vertical direction,
   the driving mechanism rotationally drives, as a common drive source, the first and second mechanisms, by winding a chain around a driving sprocket of a rotary shaft of the common drive source and around a transmission sprocket of the first and second transmission members, the workpiece lifting and lowering device is equipped on a workpiece tilting device capable of tilting, and the driving mechanism is configured between a frame of the workpiece lifting and lowering device and a bottom part of the workpiece tilting device, the first and second link mechanism including first and second arms having first and second tip ends respectively, and first and second cam plates having first and second cam grooves respectively to which the first and second tip ends are engaged respectively, the first and second arms being configured to be rotated by the first and second transmission parts via a worm gear mechanism, the first cam and second cam plates respectively having first and second grooves extending in a horizontal direction, the first and second cam followers configured on tips of the first and second arms respectively and movably engaged with the first and second grooves respectively.

\* \* \* \* \*